United States Patent [19]

Hirosawa et al.

[11] Patent Number: 4,684,962

[45] Date of Patent: Aug. 4, 1987

[54] INK TUBE CONNECTING SYSTEM IN A LIQUID JET RECORDING APPARATUS

[75] Inventors: Toshiaki Hirosawa; Yoshie Akiyama, both of Hiratsuka; Isao Ebisawa, Tokyo; Yoshifumi Hattori, Yamato; Tsutomu Abe, Isehara, all of Japan

[73] Assignee: Canon Kabushiki Kaisha, Tokyo, Japan

[21] Appl. No.: 812,068

[22] Filed: Dec. 23, 1985

[30] Foreign Application Priority Data

Dec. 28, 1984 [JP] Japan .......................... 59-200486[U]

[51] Int. Cl.[4] .............................................. G01D 15/18

[52] U.S. Cl. ................................. 346/140 R; 346/1.1; 346/75

[58] Field of Search ........................ 346/75, 140 R, 1.1

[56] References Cited

U.S. PATENT DOCUMENTS 4,394,669 7/1983 Ozawa et al. .................... 346/140 R 4,513,297 4/1985 Okamura .......................... 346/140 R 4,543,590 9/1985 Tazaki et al. .................... 346/140 R

*Primary Examiner*—E. A. Goldberg

*Assistant Examiner*—Gerald E. Preston

*Attorney, Agent, or Firm*—Fitzpatrick, Cella, Harper & Scinto

[57] ABSTRACT

An ink tube connecting method in a liquid injection recording apparatus provided with an ink jet recording head unit and an ink tank for storing therein liquid to be supplied to the ink jet recording head unit, and having an ink tube communicating the ink jet recording head unit with the ink tank and an ink tube for discharging the gas and/or liquid in the ink jet recording head unit, is characterized in that a plane formed in the connecting portion of one of the ink tubes while containing the ink tubes and a plane formed in the connecting portion of the other of the ink tubes while containing the ink tubes are arranged without perpendicularly intersecting each other, and the ink tubes are integrally arranged in parallelism to each other in at least a portion thereof. The specification also discloses such liquid injection recording apparatus.

12 Claims, 4 Drawing Figures

INK TUBE CONNECTING SYSTEM IN A LIQUID JET RECORDING APPARATUS

BACKGROUND OF THE INVENTION

1. Field of the Invention

This invention relates to an ink tube connecting method in a liquid injection recording apparatus of the type in which a recording head unit is mounted on a carriage and ink is supplied to the recording head unit through an ink tube, and to a liquid jet recording apparatus using the same connecting method.

2. Description of the Prior Art

A liquid jet recording apparatus of the type in which a recording head unit is mounted on a carriage and is connected to an ink tank by a flexible ink tube has heretofore been used as a high-performance recording apparatus such as a printer or a facsimile apparatus which is the output apparatus of a computer instrument. In the recording apparatus of this type, as shown in FIGS. 1 and 2 of the accompanying drawings, two guide shafts 2A and 2B are disposed parallel to a platen 1 and a carriage 3 is movably mounted on these guide shafts 2A and 2B. A recording head unit comprising a recording head 4 disposed in opposed relationship with the platen 1 and a sub-ink tank 5 disposed rearwardly of the recording head is mounted on the carriage 3. The recording head 4 which is recording means and the sub-ink tank 5 are connected together by a supply pipe 6 to enable ink which is a recording medium to be supplied. Further, an ink tube (supply tube) 7A for supplying ink from an ink tank (main ink tank), not shown, and an ink tube (discharge tube) 7B for discharging ink and/or gas by the operation of a suction pump for sucking ink from the recording head 4 are connected to the sub-ink tank 5. The tubes 7A and 7B are connected to the sub ink tank 5 through couplings 8A and 8B provided on a side of the sub-ink tank, and particularly, the discharge tube coupling 8B is positioned vertically above the supply tube coupling 8A to keep the quantity of ink in the sub-ink tank 5 constant. The two tubes 7A and 7B are juxtaposed and made intergral with each other and are drawn around to the rearward main tank with an allowance length sufficient to be capable of following the movement of the carriage 3, and the material of these tubes is flexible.

However, in the structure according to the prior art, where the flexible tubes 7A and 7B are juxtaposed and made integral with each other, the plane of juxtaposition is a vertical plane, and this has led to a problem that when the carriage 3 is slidingly moved, the whole of the tubes 7A and 7B juts out of the guide shaft 2A. Therefore, a sufficient space for the fixing and operation of the tubes 7A and 7B is required outside the rearward guide shaft 2A, and this has led to the bulkiness of the apparatus.

SUMMARY OF THE INVENTION

In view of the above-noted problems peculiar to the prior art, the present invention intends to provide a liquid jet recording apparatus of the type in which a recording head unit is mounted on a carriage and wherein during movement of the carriage, ink tubes connecting the ink tank and the recording head unit together are operable only within a predetermined range of a carriage guide shaft to thereby achieve compactness of the apparatus.

It is another object of the present invention to provide an ink tube connecting method in a liquid injection recording apparatus provided with an ink jet recording head unit and an ink tank for storing therein liquid to be supplied to said ink jet recording head unit, and having an ink tube communicating said ink jet recording head unit with said ink tank and an ink tube for discharging the gas and/or liquid in said ink jet recording head unit and wherein a plane formed in the connecting portion of one of said ink tubes while containing said ink tubes and a plane formed in the connecting portion of the other of said ink tubes while containing said ink tubes are arranged without perpendicularly intersecting each other and said ink tubes are integrally arranged in parallelism to each other in at least a portion thereof.

It is still another object of the present invention to provide a liquid jet recording apparatus provided with an ink jet recording head unit, an ink tank for storing therein liquid to be supplied to said ink jet recording head unit, an ink tube communicating said ink jet recording head unit with said ink tank, and an ink tube for discharging the gas and/or liquid in said ink jet recording head unit and wherein said ink tubes are integrally arranged in parallelism to each other in at least a portion thereof and said ink tubes are disposed so that a plane containing said ink tubes at an end of one of said ink tubes and a plane containing said ink tubes at an end of the other of said ink tubes do not substantially perpendicularly intersect each other.

Other objects of the present invention will become apparent from the following detailed description.

DESCRIPTION OF THE PREFERRED EMBODIMENT

The ink tube connecting method in the liquid jet recording apparatus of the present invention which achieves the above objects is a method of connecting a plurality of ink tubes provided in parallel between an ink jet recording head unit and an ink tank so that the parallel surface on the ink tank side does not perpendicularly intersect the parallel surface on the recording head unit side.

Also, the liquid jet recording apparatus of the present invention which achieves the above objects has an ink tube for communicating an ink jet recording head unit with an ink tank and an ink tube for discharging the unnecessary gas and/or surplus liquid in the ink jet recording head portion, and when planes containing the ink tubes on the mounting surfaces of the ink tubes of the liquid jet recording apparatus in which at least portions of these tubes are integrally disposed in parallel are supposed, said ink tubes are mounted so that those formed planes do not perpendicularly intersect each other.

Figure 1:
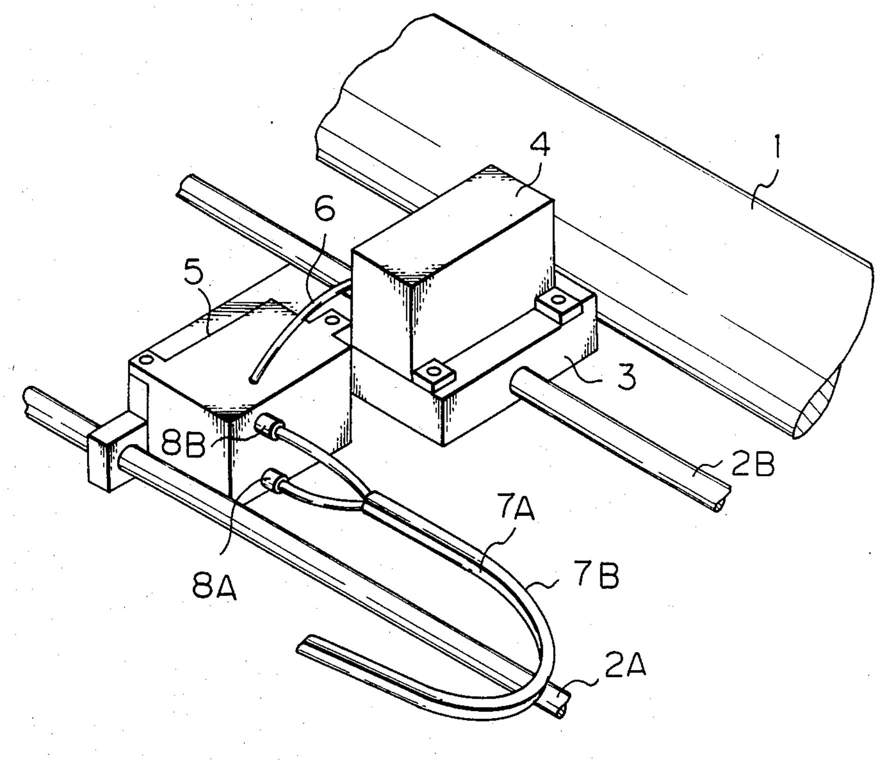
Fig. 1 PRIOR ART
FIG. 1 is a perspective view showing the essential portions of a liquid jet recording apparatus according to the prior art.
Figure 2:
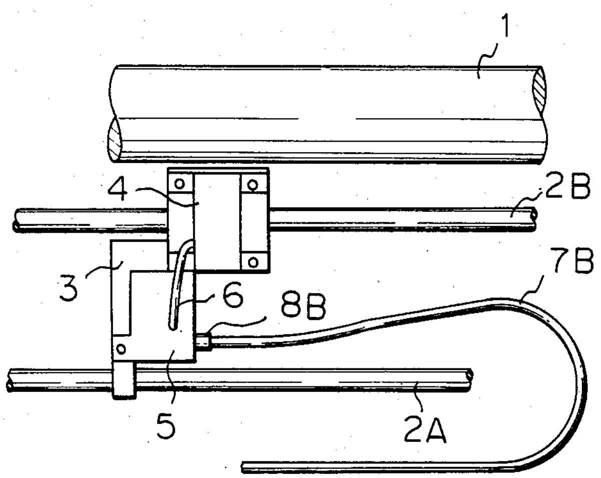
Fig. 2 PRIOR ART
FIG. 2 is a plan view of the apparatus of FIG. 1.
Figure 3:
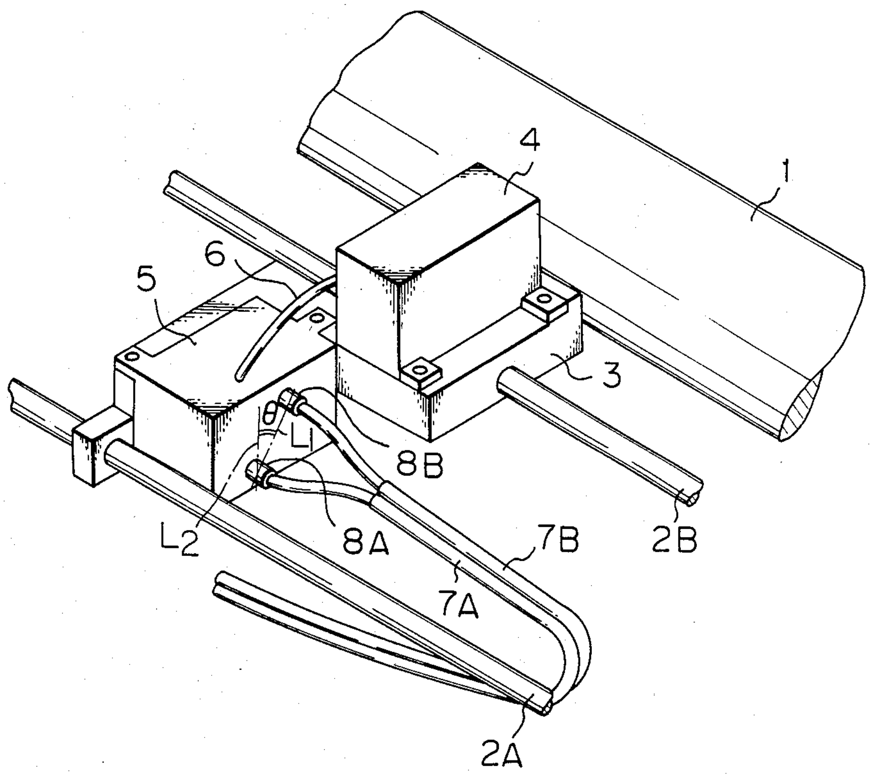
FIG. 3 is a perspective view showing the essential portions of a liquid jet recording apparatus according to an embodiment of the present invention.

An embodiment of the liquid jet recording apparatus according to the present invention will hereinafter be described in detail with reference to FIGS. 3 and 4. In these Figures, members similar to those in the example of the prior art shown in FIGS. 1 and 2 are given similar reference characters.

As shown, in this liquid jet recording apparatus, a platen 1 and two guide shafts 2A and 2B are parallel-disposed, and a carriage 3 is mounted on the guide shafts 2A and 2B and is movable in face-to-face relationship with the platen 1. An ink jet recording head unit comprising a recording head 4 and a sub ink tank 5 is mounted on the carriage 3, and the recording head and the sub ink tank are connected together by a supply pipe 6. An ink tube (supply tube) 7A for supplying ink from an ink tank, not shown, and an ink tube (discharge tube) 7B for returning the ink to a suction pump are connected to the sub ink tank 5, and these are connected together through coupling portions 8A and 8B provided on a side of the sub-ink tank 5. Of the coupling portions 8A and 8B the coupling portion 8B on the ink discharge side is set above the coupling portion 8A on the supply side to keep the quantity of ink in the sub-ink tank 5 constant.

In the present embodiment, as shown, the coupling portion 8B on the discharge tube side is disposed at a position off-set from a perpendicular line passing through the coupling portion 8A on the supply tube side. That is, as shown in FIG. 3, the positions at which the coupling portions 8A and 8B are disposed are off-set so that a line segment $L_1$ linking the lower coupling portion 8A and the upper coupling portion 8B forms an angle $\theta$ with a straight line $L_2$ passing vertically through the lower coupling portion 8B. This angle $\theta$ is preferably large, such that the line segment L1 approaches a horizontal line. As the vertical levels of the coupling portions 8A and 8B become substantially equal, the angle $\theta$ may be made large by spacing the two coupling portions as far apart as possible in the longitudinal direction orthogonal to the pair of guide shafts 2A and 2B. The tubes 7A and 7B connected to the coupling portions 8A and 8B, as shown in FIG. 4, are arranged horizontally and integrally bundled and are drawn around toward the ink tank, not shown, and particularly are set so as to be turned back while forming a loop along a vertical plane inside the pair of guide shafts 2A and 2B.

Figure 4:
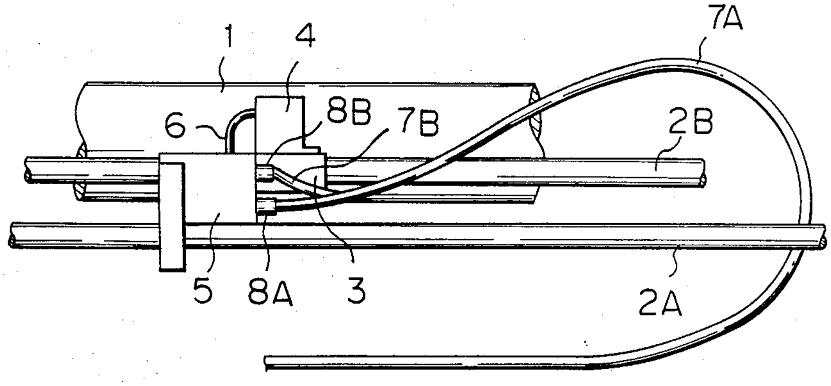
FIG. 4 is a plan view of the apparatus of FIG. 3.

According to the thus constructed liquid injection recording apparatus, the coupling portion 8B on the discharge tube side is disposed on the recording head unit (the sub ink tank 5) at a position off-set from the point vertically above the coupling portion 8A on the supply tube side and therefore, the supply tube 7A and the discharge tube 7B can be arranged in parallelism to the sliding surface of the carriage 3 in their natural condition and be made integral with each other, and as shown in FIG. 4, the tubes 7A and 7B can be reciprocally moved between the guide shafts 2A and 2B, and at this time, the loop only becomes larger or smaller in the vertical plane and does not jut out behind the guide shaft 2A. Consequently, no external space for the guide shaft 2A is needed and thus, it becomes possible to make the apparatus compact.

The present invention is equally applicable to a case where the ink tubes are connected to a recording head unit which does not have the sub ink tank 5, whereby it can achieve the same operational effect. The present invention is also applicable to a case where the ink tank and the recording head unit are mounted on the carriage.

According to the present invention, as described above, during the operation of the carriage, no unreasonable force is applied to the ink tubes connected from the ink tank to the recording head unit on the carriage, and the supply and discharge tubes can be connected in their natural condition and can be integrally reciprocated at a predetermined angle of parallel arrangement with respect to the sliding surface of the carriage, and as a result, compactness of the apparatus can be realized.

We claim:

1. An ink tube connecting method in a liquid jet recording apparatus including an ink jet recording head unit arranged for operating in a scanning movement, an ink tank for storing therein liquid to be supplied to said ink jet recording head unit, an ink tube communicating said ink jet recording head unit with said ink tank, and an ink tube for discharging the gas and/or liquid in said ink jet recording head unit, said connecting method comprising the steps of:

integrally attaching said ink tubes together in parallel for at least a portion thereof;

arranging the ends of said ink tubes to be separated;

extending the integral, parallel portion of said ink tubes along a direction generally parallel to the direction of scanning movement of said ink jet recording head unit; and connecting said ink tubes to said ink jet recording head unit such that a plane formed by the connection of one of said ink tubes to said ink jet recording head unit and containing both of said ink tubes and another plane formed by the connection of the other of said ink tubes to said ink jet recording head unit and containing both of said ink tubes are arranged without perpendicularly intersecting each other.

2. An ink tube connecting method according to claim 1, wherein the respective ends of each of said ink tubes are arranged to be connected facing in the same direction at the opposite ends thereof.

3. An ink tube connecting method according to claim 1, wherein said ink jet recording head unit is mounted on a reciprocally movable carriage.

4. An ink tube connecting method according to claim 3, wherein said ink tank is mounted on said carriage.

5. A liquid jet recording apparatus provided with an ink jet recording head unit arranged for operating in a scanning movement, an ink tank for storing therein liquid to be supplied to said ink jet recording head unit, an ink tube communicating said ink jet recording head unit with said ink tank, and an ink tube for discharging the gas and/or liquid in said ink jet recording head unit, wherein said ink tubes are integrally attached together in parallel for at least a portion thereof, the ends of said ink tubes being separated, and the integral, parallel portion of said ink tubes extending along a direction generally parallel to the direction of scanning of said ink jet recording head unit, and wherein said ink tubes are connected to said ink jet recording head unit so that a plane containing one of said ink tubes at its connection with said recording head unit and both of said ink tubes and another plane containing the other of said ink tubes its connection with said recording head unit and both of said ink tubes do not perpendicularly intersect each other.

6. A liquid jet recording apparatus according to claim 5, wherein the respective ends of said ink tubes are arranged to be connected facing in the same direction at the opposite ends thereof.

7. A liquid jet recording apparatus according to claim 5, wherein said ink jet recording head unit has an ink jet recording head and a sub-tank.

8. A liquid jet recording apparatus according to claim 7, wherein said ink jet recording head and said sub-tank are provided separately from each other.

9. A liquid jet recording apparatus according to claim 5, wherein said ink jet recording head unit is mounted on a reciprocally movable carriage.

10. A liquid jet recording apparatus according to claim 9, wherein said ink tank is mounted on said carriage.

11. A liquid jet recording apparatus according to claim 5, wherein said ink tube for the supply of ink is connected to said ink jet recording head unit vertically above said ink tube for discharging the gas and/or liquid.

12. A liquid jet recording apparatus according to claim 5, wherein said ink tube for discharging the gas and/or liquid is connected to a suction pump.

* * * * *

UNITED STATES PATENT AND TRADEMARK OFFICE
CERTIFICATE OF CORRECTION

PATENT NO. : 4,684,962

DATED : August 4, 1987

INVENTOR(S) : TOSHIAKI HIROSAWA, ET AL.

It is certified that error appears in the above-identified patent and that said Letters Patent is hereby corrected as shown below:

COLUMN 1

Line 42, "intergral" should read --integral--.

COLUMN 3

Line 31, "L1" should read --$L_1$--.

COLUMN 4

Line 62, "its" should read --at its--.

Signed and Sealed this

Ninth Day of February, 1988

Attest:

DONALD J. QUIGG

*Attesting Officer*

*Commissioner of Patents and Trademarks*